US012771216B2

(12) United States Patent
Eguchi et al.

(10) Patent No.: US 12,771,216 B2
(45) Date of Patent: Oct. 20, 2026

(54) DRIVE DEVICE

(71) Applicant: NISSAN MOTOR CO., LTD., Yokohama (JP)

(72) Inventors: Kazuki Eguchi, Kanagawa (JP); Jun Yoshizawa, Kanagawa (JP); Yuichi Nakata, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 155 days.

(21) Appl. No.: 18/864,377

(22) PCT Filed: May 25, 2022

(86) PCT No.: PCT/JP2022/021450
§ 371 (c)(1),
(2) Date: Nov. 8, 2024

(87) PCT Pub. No.: WO2023/228333
PCT Pub. Date: Nov. 30, 2023

(65) Prior Publication Data
US 2025/0300528 A1 Sep. 25, 2025

(51) Int. Cl.
*H02K 5/20* (2006.01)
*H02K 5/22* (2006.01)
*H02K 11/33* (2016.01)

(52) U.S. Cl.
CPC ............. *H02K 11/33* (2016.01); *H02K 5/203* (2021.01); *H02K 5/22* (2013.01)

(58) Field of Classification Search
CPC ............ H02K 5/20; H02K 5/203; H02K 5/22; H02K 5/225; H02K 11/30; H02K 11/33
See application file for complete search history.

(56) References Cited

U.S. PATENT DOCUMENTS

2015/0076942 A1* 3/2015 Madsen Obel .......... H02K 9/06 310/59
2018/0159403 A1 6/2018 Yokoyama et al.
(Continued)

FOREIGN PATENT DOCUMENTS

CN 105914954 B * 5/2021 ............ H02K 11/33
JP 6406443 B2 10/2018
WO WO-2020/209324 A1 10/2020

OTHER PUBLICATIONS

Nagao, Machine Translation of CN105914954, May 2021 (Year: 2021).*

*Primary Examiner* — Eric Johnson
(74) *Attorney, Agent, or Firm* — Foley & Lardner LLP

(57) ABSTRACT

A rotary electric machine includes a motor housing, and the motor housing has a recessed portion in an upper portion. The inverter device includes an inverter housing having a lid shape, an electric component is disposed toward the rotary electric machine on an inner surface of the inverter housing, and the inverter housing is fixed to the motor housing such that an accommodation chamber in which the electric component is accommodated is formed by the inverter housing and the recessed portion. In the accommodation chamber, the electric component includes a first electric component and a second electric component having a temperature higher than that of the first electric component, and the first electric component and the second electric component are disposed apart from each other in an axial direction of the rotary electric machine.

5 Claims, 4 Drawing Sheets

(56) References Cited

U.S. PATENT DOCUMENTS

| | | | | |
|---|---|---|---|---|
| 2019/0296612 | A1* | 9/2019 | Okuhata ................ | H02K 11/33 |
| 2021/0218310 | A1* | 7/2021 | Stengert ................... | H02K 5/20 |
| 2022/0173641 | A1 | 6/2022 | Fujimoto et al. | |

* cited by examiner

【Fig. 1】
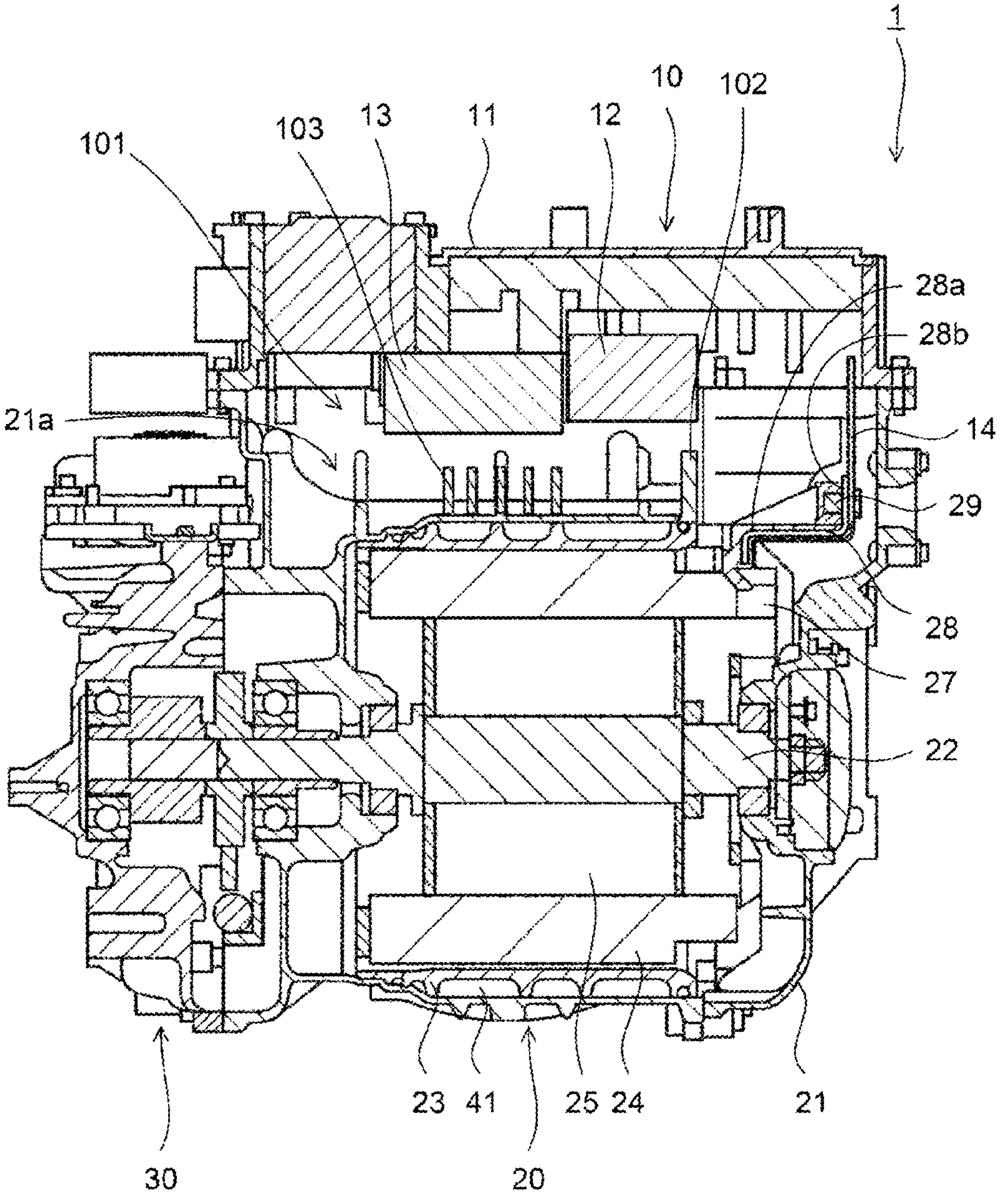

【Fig. 2】
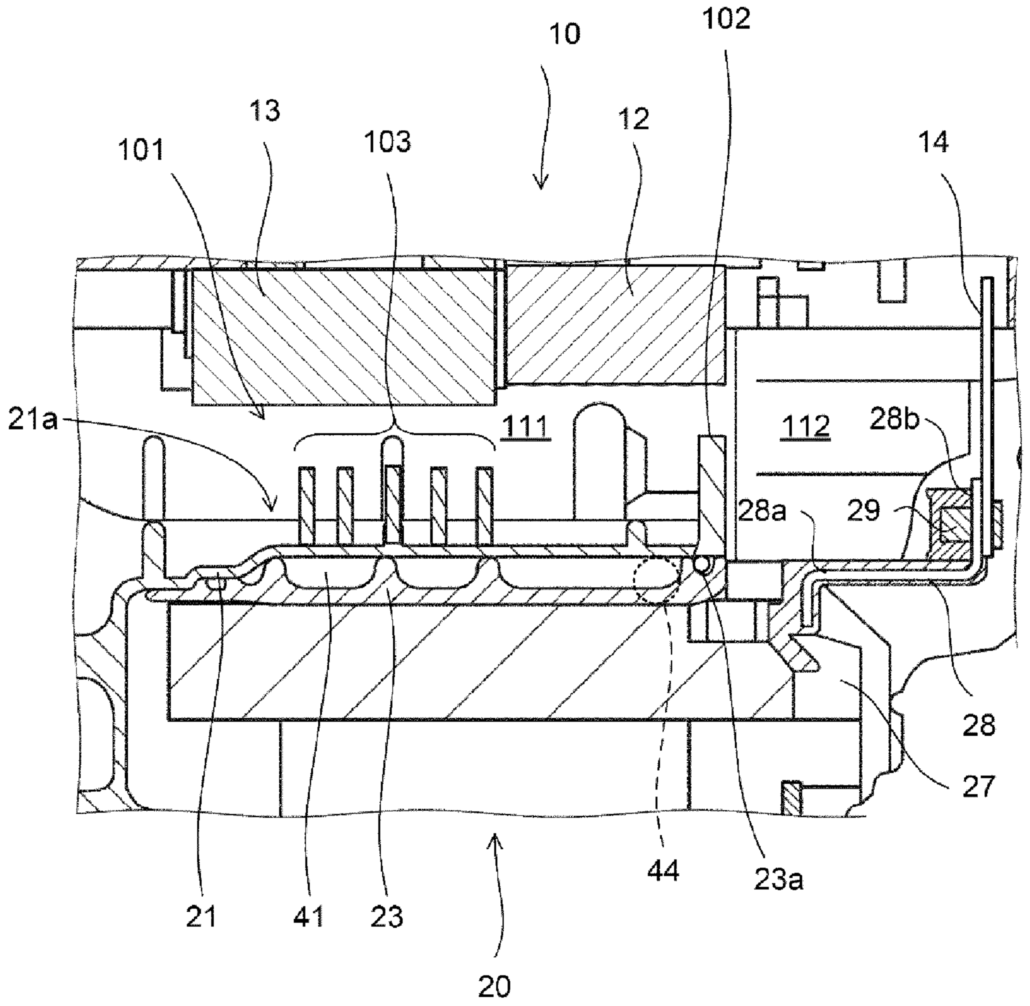

【Fig. 3】
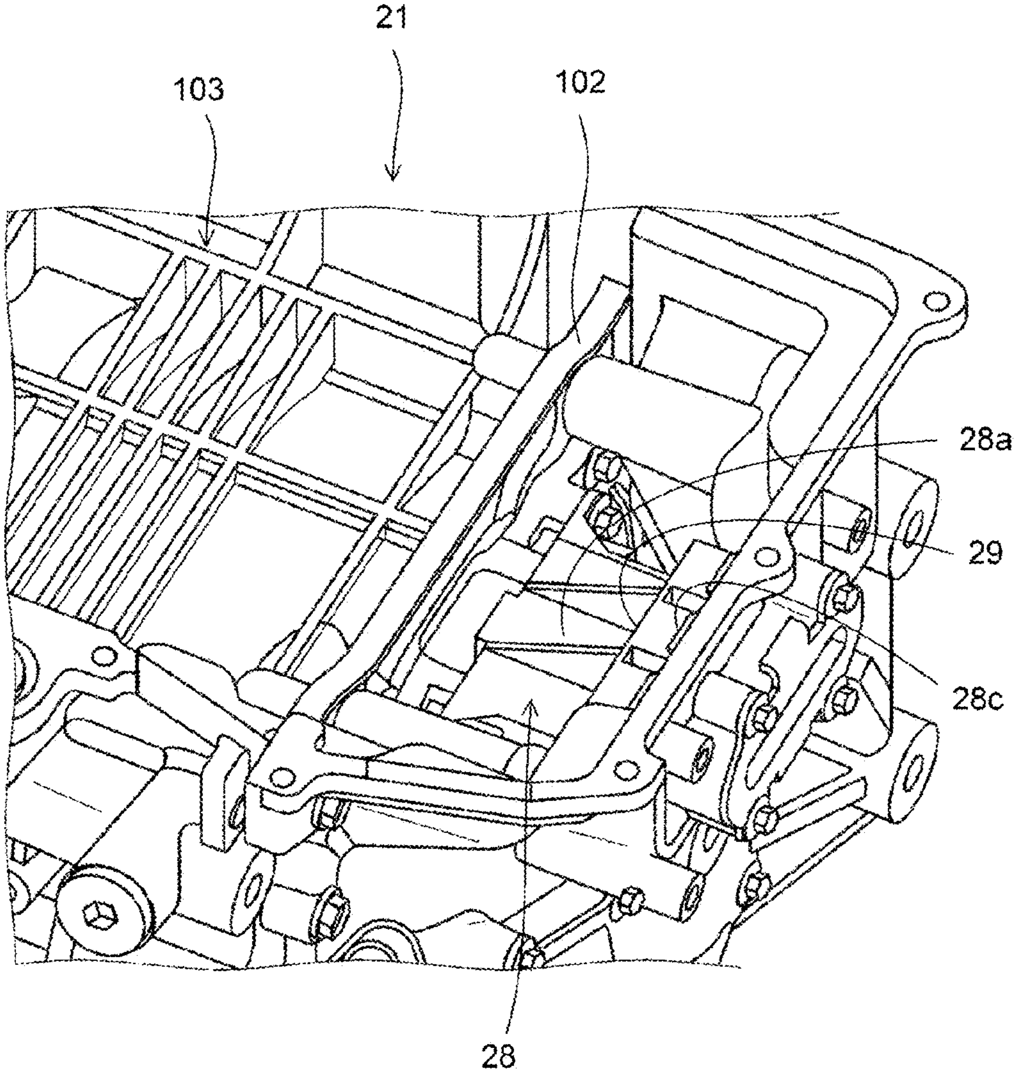

【Fig. 4】
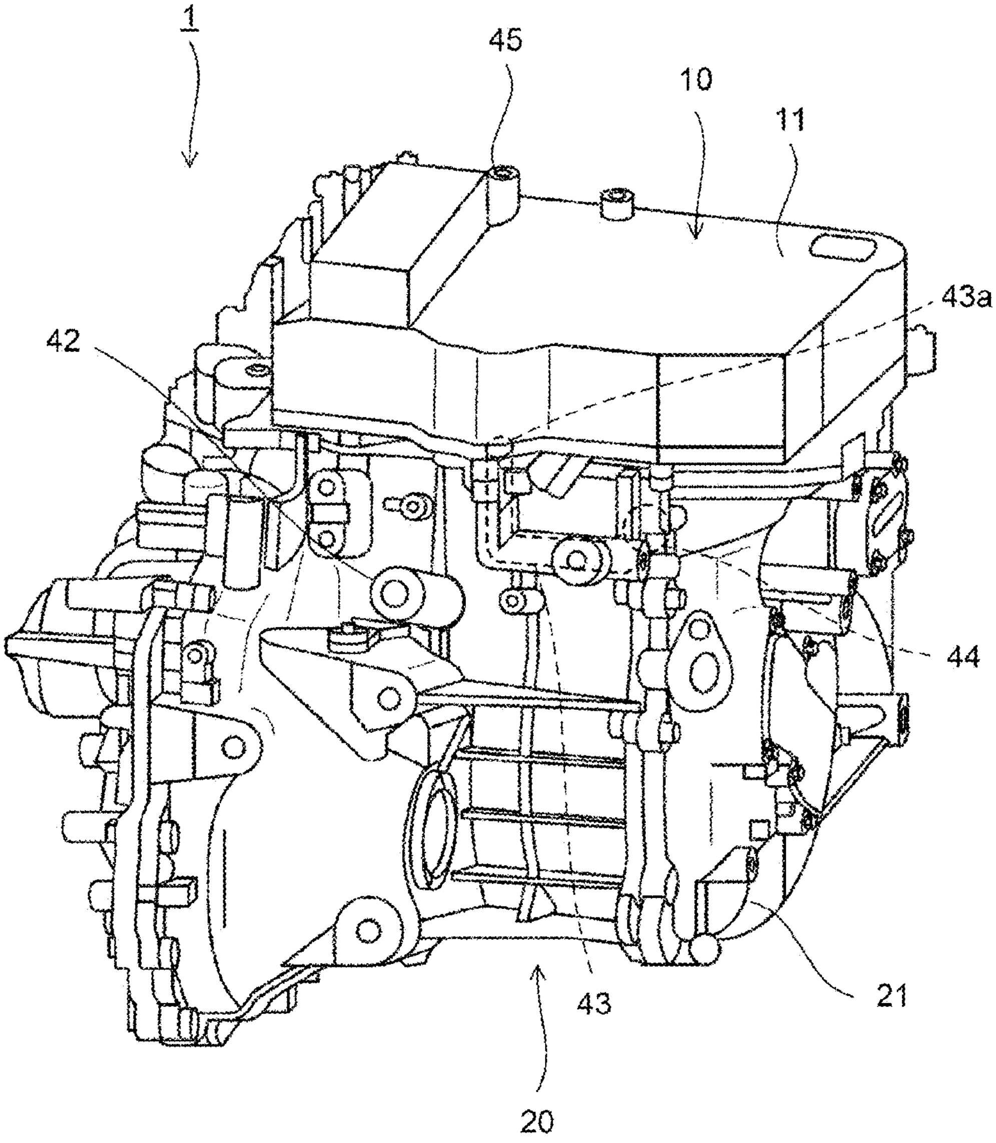

DRIVE DEVICE

TECHNICAL FIELD

The present invention relates to a drive device.

BACKGROUND ART

A power conversion device that supplies power to a rotary electric machine is implemented in a manner that electric components such as a power module, a capacitor module, and a bus bar are housed in a housing. JP6406443B discloses a configuration in which a power module and a capacitor module are disposed on an upper surface of a support member including a cooling flow path, the support member is accommodated in an electric motor housing, and the support member is closed by an upper surface plate.

SUMMARY OF INVENTION

Problem to be Solved by the Invention

In the related art, the need for support members to cool the power module and an upper surface plate to cover the motor housing increases the number of components, resulting in problems with size and weight. It is possible to consider a configuration in which the support members are omitted in order to reduce size and weight, but in that case there is a problem that heat-generating electric components such as bus bars are likely to affect other electric components.

The present invention has been made in view of such a problem, and an objective thereof is to provide a technique for suppressing an influence of heat on an electric component.

Means for Solving the Problem

An embodiment of the present invention is applied to a drive device including a rotary electric machine and an inverter device disposed on an upper portion of the rotary electric machine and configured to exchange electric power with the rotary electric machine. The drive device includes a motor housing for accommodating the rotary electric machine, and the motor housing has a recessed portion in an upper portion. The inverter device includes an inverter housing having a lid shape, and an electric component is disposed on an inner surface of the inverter housing facing to the rotary electric machine. The inverter housing is fixed to the motor housing, such that an accommodation chamber in which the electric component is accommodated is formed by the inverter housing and the recessed portion of the motor housing. In the accommodation chamber, the electric component includes a first electric component and a second electric component having a temperature higher than that of the first electric component, and the first electric component and the second electric component are disposed apart from each other in an axial direction of the rotary electric machine.

Effect of the Invention

According to the present invention, in the configuration in which the electric component is disposed on the inner surface of the inverter housing and the electric component is accommodated in the accommodation chamber between the inverter housing and the motor housing, the second electric component having a higher temperature and the first electric component are disposed apart from each other, and thus the heat of the second electric component can be suppressed from being transferred to the first electric component.

BRIEF DESCRIPTION OF DRAWINGS

FIG. 1 is a cross-sectional view of a drive device according to an embodiment of the present invention.

FIG. 2 is a cross-sectional view of an inverter device.

FIG. 3 is a perspective view of a motor housing.

FIG. 4 is a perspective view of the drive device.

DESCRIPTION OF EMBODIMENTS

Hereinafter, an embodiment of the present invention will be described with reference to the drawings or the like.

FIG. 1 is a configuration diagram of a drive device 1 according to an embodiment of the present invention.

The drive device 1 includes a power conversion device (inverter device) 10, a motor 20, and a decelerator 30. The drive device 1 is mounted on an electric vehicle, and drives the motor 20 by receiving power supplied from a battery (not illustrated), thereby causing the electric vehicle to travel.

The motor 20 transfers rotation to drive wheels via the decelerator 30 to drive the electric vehicle. The motor 20 also functions as a generator that generates regenerative power during deceleration of the electric vehicle. The decelerator 30 decelerates rotation of a rotary shaft 22 of the motor 20 and transfers the decelerated rotation to the drive wheels. The motor 20 and the decelerator 30 are disposed in a motor housing 21.

The motor 20 includes an inner housing 23, a stator 24, and a rotor 25. The inner housing 23 accommodating the stator 24 and the rotor 25 is fitted into the motor housing 21. A gap is formed between the motor housing 21 and the inner housing 23, and the gap is implemented as a cooling water flow path 41. The cooling water flow path 41 is formed in a manner that cooling water circulates around an outer periphery of the stator 24 of the motor 20. The rotary shaft 22 is provided at a rotation center of the rotor 25. The rotary shaft 22 is coupled to the decelerator 30.

The inverter device 10 is disposed on an upper portion of the motor housing 21. The inverter device 10 includes an inverter housing 11, and electric components such as a power module 12, a capacitor module 13, and a three-phase inverter side bus bar 14 accommodated in the inverter housing 11.

An outer edge portion of the inverter housing 11 extends toward the motor housing 21, and the inverter housing 11 has a box shape that opens downward. The inverter housing 11 covers the motor housing 21 in a lid shape and is fixed to the motor housing 21 by bolting or the like. In a state in which the inverter housing 11 is fixed to the motor housing 21, a space defined by an inner surface of the inverter housing 11 and a recessed portion 21*a* on an upper side of the motor housing 21 is defined as an accommodation chamber 101 that houses electric components.

In the accommodation chamber 101, the power module 12 and the capacitor module 13 are fixed to the inner surface of the inverter housing 11 and are disposed in a manner of facing to a motor housing 21 side. The inverter side bus bar 14 is connected to the power module 12 on an inverter housing 11 side, and is disposed in a manner of facing to the motor housing 21 side at a position separated from the power module 12. A distal end portion of the inverter side bus bar 14 is connected to the motor side bus bar 28.

The three-phase motor side bus bar 28 extends from an upper portion of an axial end portion of the motor 20. The motor side bus bar 28 includes an extension portion 28*a* extending outward (rightward in FIG. 1) from a coil end 27 of the motor 20 along the axial direction, and an upper extension portion 28*b* extending upward from an end portion of the extension portion 28*a*.

The motor side bus bar 28 and the inverter side bus bar 14 are fixed by a connection portion 29. The connection portion 29 is constituted by a bolt and a nut, and electrically conducts the inverter side bus bar 14 and the motor side bus bar 28 by fastening together a fixing hole formed in the inverter side bus bar 14 and a fixing hole formed in the upper extension portion 28*b* of the motor side bus bar 28.

Next, an arrangement of the electric components of the inverter device 10 implemented as described above will be described.

The accommodation chamber 101 of the inverter device 10 includes the power module 12, the capacitor module 13, and the inverter side bus bar 14. A lower end portion of the inverter side bus bar 14 is connected to the motor side bus bar 28 by the connection portion 29.

Here, the heat transfer of the electric components provided in the accommodation chamber 101 of the inverter device 10 will be described.

In general, functional electric components such as the power module 12 and the capacitor module 13 are electric components (hereinafter, referred to as "first electric components") having a predetermined upper operating temperature limit and a relatively low heat resistance temperature (for example, 150° C.). On the other hand, electric wire components such as the inverter side bus bar 14 and the motor side bus bar 28 are electric components (hereinafter, referred to as "second electric components") having a wide operating temperature range and a relatively high heat resistance temperature (for example, 300° C.). The temperature of the motor side bus bar 28 becomes higher due to heat transferred from the coil end 27 of the motor 20. The temperature of the connection portion 29 that connects the inverter side bus bar 14 and the motor side bus bar 28 becomes higher due to contact resistance. The inverter side bus bar 14 connects the connection portion 29 and the power module 12 to each other, and creepage distances between these components are large and the components are fixed inside the inverter housing 11, and thus an effect of heat on the first electric components is small.

Thus, in a case in which the first electric component and the second electric component are disposed in the same space in the accommodation chamber 101, heat generated from the second electric component having a wide operating temperature range and a higher temperature radiates and is transferred to the first electric component having a temperature lower than that of the second electric component.

Among the first electric components, the power module 12 is a component that generates heat, and is implemented in a manner of being in direct contact with the cooling water flow path formed in the inverter housing 11 and being normally cooled. Among the first electric components, the capacitor module 13 is implemented in a manner of not being cooled by the cooling water because a heat generation range thereof is small. Therefore, in a case in which the second electric component that generates heat is disposed nearby, the first electric component receives heat, and the influence of the heat increases.

In contrast, among the second electric components, the connection portion 29 that connects the inverter side bus bar 14 and the motor side bus bar 28 has a high temperature during operation, and therefore a component that easily transfer heat to the first electric component. As a result of the second electric component providing heat to the first electric component, the temperature of the first electric component that has received heat may approach the heat resistance temperature.

In order to prevent this, it is conceivable to implement the inverter housing in a box shape so as to prevent heat from being transferred to the electric components within the accommodation chamber of the inverter device. However, such a configuration causes a new problem that the size and weight of the inverter device increase.

In the present embodiment, as will be described below, a problem of heat of electric components in the inverter device 10 is prevented from occurring while suppressing an increase in the size and weight of the inverter device 10.

FIG. 2 is a cross-sectional view of the drive device 1 with the inverter device 10 at a center. FIG. 3 is a perspective view of the accommodation chamber 101 of the motor housing 21 with the inverter device 10 removed.

As illustrated in FIG. 2, the extension portion 28*a* of the motor side bus bar 28 extends from the coil end 27 of the motor 20 along the axial direction toward an outer side opposite to the decelerator 30. The capacitor module 13 is disposed leftward as compared with the power module 12 in the accommodation chamber 101, that is, at a position separated from the motor side bus bar 28.

Accordingly, the capacitor module 13 fixed to the inverter housing 11 and the connection portion 29 that connects the inverter side bus bar 14 and the motor side bus bar 28 are disposed apart from each other in the axial direction, and heat of the motor side bus bar 28 and the connection portion 29 is suppressed from being transferred to the capacitor module 13.

Further, in the drive device 1 according to the present embodiment, an upper surface of the motor housing 21, that is, a bottom surface of the accommodation chamber 101 is formed with a shielding wall 102 having a flat plate shape erecting upward from the bottom surface. The shielding wall 102 separates the inside of the accommodation chamber 101 into a region in which the first electric components (the power module 12 and the capacitor module 13) are disposed and a region in which the second electric components (the motor side bus bar 28 and the connection portion 29) are disposed.

More specifically, the shielding wall 102 extends in a direction orthogonal to the axial direction as illustrated in FIG. 3, and is erected on the upper surface of the motor housing 21 in a manner of partition the inside of the accommodation chamber 101 into a region (a second region 112) in which the inverter side bus bar 14, the motor side bus bar 28, and the connection portion 29 are disposed and a region (a first region 111) in which the power module 12 and the capacitor module 13 are disposed.

Accordingly, the presence of the shielding wall 102 on a line connecting the connection portion 29 and the capacitor module 13 suppresses direct transfer of heat from the connection portion 29 to the capacitor module 13.

In motor housing 21, an axial position at which the shielding wall 102 is erected is configured to be the same as an axial position at which a seal member 23*a* of the inner housing 23 fitted into the motor housing 21 is disposed.

The seal member 23*a* of the inner housing 23 is compressed between the seal member and an inner peripheral surface of the motor housing 21 to seal the cooling water in the cooling water flow path 41 so as to prevent leakage of the cooling water. Therefore, a radially outward stress acts on a portion of the motor housing 21 with which the seal member 23*a* is in contact. By forming the shielding wall 102 at the portion of the motor housing 21 where the stress acts, a wall thickness of the motor housing 21 is increased, and rigidity of the motor housing 21 at the portion where the seal member 23*a* comes into contact can be increased. Accordingly, the cooling water in the cooling water flow path 41 can be more reliably sealed.

Further, as illustrated in FIG. 3, a plurality of ribs 103 having a flat plate shape protruding toward the capacitor module 13 are formed on the upper surface of the motor housing 21, that is, on the bottom surface of the accommodation chamber 101 at positions facing to the capacitor module 13. The cooling water flow path 41 is formed between the motor housing 21 and the inner housing 23 of the motor 20, and the rib 103 is disposed in a manner of being positioned radially outer side the cooling water flow path 41 of the motor housing 21. The shape of the rib 103 is not limited to the flat plate shape, and may be various shapes such as a plurality of protrusions or irregularities formed on the upper surface of the motor housing 21.

By arranging the plurality of ribs 103 in the motor housing 21, the atmosphere around the ribs 103 is cooled by the cooling water. Accordingly, the heat transferred from the second electric component can be reduced, and in particular, the heat transferred to the capacitor module 13 can be reduced.

Next, the cooling water flow path of the drive device 1 will be described. FIG. 4 is a perspective view of the drive device 1 of according to the present embodiment.

The inverter housing 11 of the drive device 1 includes a cooling water inlet 45 from which cooling water flows in from the outside. The cooling water inlet 45 communicates with an inverter side cooling water flow path (not illustrated) formed in the inverter housing 11. The cooling water flowing into the inverter side cooling water flow path cools the electric components (the power module 12) of the inverter device 10, and then flows into a housing side flow path 43 from a motor side cooling water inlet 43*a* formed at a portion where the inverter housing 11 and the motor housing 21 are in contact with each other. The housing side flow path 43 includes a communication port 44 (see FIG. 2) that communicates with the cooling water flow path 41 formed between the motor housing 21 and the inner housing 23 in the motor housing 21. The communication port 44 is disposed at a portion close to the shielding wall 102.

The motor 20 is cooled by the cooling water that flows in from the housing side flow path 43 and flows into the cooling water flow path 41 through the communication port 44. The cooling water flow path 41 communicates with a cooling water outlet 42 formed in the motor housing. The cooling water circulated through the cooling water flow path 41 flows out from the cooling water outlet 42.

In the motor housing 21, the cooling water having a lowest temperature flowing from the inverter housing 11 through the motor side cooling water inlet 43*a* flows into the cooling water flow path 41 through the communication port 44 positioned at a portion close to the shielding wall 102, and thus the temperature of the shielding wall 102 can be lowered. Accordingly, the heat to be transferred from the second electric component can be reduced.

As described above, the present embodiment is the drive device 1 including the rotary electric machine (the motor 20) and the inverter device 10 that is disposed on the upper portion of the motor 20 and exchanges electric power with the motor 20. The motor 20 includes the motor housing 21, and the motor housing 21 has the recessed portion 21*a* in the upper portion. The inverter device 10 includes the inverter housing 11 having a lid shape, an electric component is disposed on an inner surface of the inverter housing 11 facing to the motor 20, and the inverter housing 11 is fixed to the motor housing 21, such that the accommodation chamber 101 in which the electric component is accommodated is formed by the inverter housing 11 and the recessed portion 21*a*. In the accommodation chamber 101, the electric components include the first electric component (for example, the capacitor module 13) and the second electric component having a temperature higher than that of the first electric component (for example, the motor side bus bar 28), and the first electric component and the second electric component are disposed apart from each other in the axial direction of the rotary electric machine.

According to this configuration, in the configuration in which the electric component is disposed on the inner surface of the inverter housing 11 and the electric component is accommodated in the accommodation chamber 101 between the inverter housing 11 and the motor housing 21, the second electric component having a higher temperature and the first electric component are disposed apart from each other, and thus it is possible to suppress the heat of the second electric component from being transferred to the first electric component.

In the present embodiment, the recessed portion 21*a* of the motor housing 21 is formed with the shielding wall 102 that separates a space in the accommodation chamber 101 into the first region 111 in which the first electric component is disposed and the second region 112 in which the second electric component is disposed.

According to this configuration, the shielding wall 102 is formed to separate the first electric component that is likely to receive heat and the second electric component that is likely to provide heat, thereby suppressing the heat from the second electric component from being directly transferred to the first electric component.

In the present embodiment, the motor housing 21 includes the cylindrical inner housing 23 into which the stator 24 of the motor 20 is fitted. The cooling water flow path 41 is formed between the inner housing 23 and the motor housing 21. The seal member 23*a* is provided at a joint portion where the inner housing 23 and the motor housing 21 are in contact with each other, and the shielding wall 102 is erected at an outer peripheral portion of the joint portion of the motor housing 21.

According to this configuration, since the rigidity of the motor housing 21 can be increased by forming the shielding wall 102 at the joint portion where the stress from the inner housing 23 acts, the cooling water in the cooling water flow path 41 can be more reliably sealed.

In the present embodiment, the first electric component is the capacitor module 13 constituting the inverter device 10, and the rib 103 protruding toward the capacitor module 13 is formed in the recessed portion 21*a* at a position facing to the capacitor module 13.

According to this configuration, since the plurality of ribs 103 are disposed on an outer surface of the cooling water flow path 41 of the motor housing 21, the atmosphere around the ribs 103 can be cooled, and the heat to be transferred to the capacitor module 13 can be reduced.

In the present embodiment, the second electric component is the three-phase motor side bus bar 28 that exchanges electric power between the motor 20 and the inverter device 10, and the motor side bus bar 28 extends outward in the axial direction than the shielding wall 102 in the motor 20.

According to this configuration, the motor side bus bar 28 is disposed apart from the first electric component (the capacitor module 13) in the axial direction, and thus the heat generated by the motor side bus bar 28 and the connection portion 29, which belong to the second electric component, is suppressed from being transferred to the first electric component.

In the present embodiment, the motor housing 21 includes the motor side cooling water inlet 43*a* from which the cooling water flows in and the cooling water flow path 41 through which the cooling water flowing in from the motor side cooling water inlet 43*a* circulates along the outer periphery of the stator 24, and the communication port 44 connecting the motor side cooling water inlet 43*a* and the cooling water flow path 41 is provided at a position close to the shielding wall 102.

According to this configuration, in the motor housing 21, the cooling water having the lowest temperature flowing from the inverter housing 11 flows into the cooling water flow path 41 through the communication port 44 positioned at a portion close to the shielding wall 102, and thus the temperature of the shielding wall 102 can be lowered, and the heat to be transferred from the second electric component can be reduced.

Although the embodiment and modifications of the present invention have been described above, the above embodiment and modifications are merely a part of application examples of the present invention, and do not mean that the technical scope of the present invention is limited to the specific configurations of the above embodiment.

In the present embodiment, a hybrid vehicle in which a generator is driven by an engine and travels by a driving force of the motor is described, whereas the present invention is not limited thereto, and can be similarly applied to a drive device of an electric vehicle that travels with the driving force of the motor.

The invention claimed is:

1. A drive device, comprising:

a rotary electric machine; and an inverter device disposed on an upper portion of the rotary electric machine and configured to exchange electric power with the rotary electric machine, wherein the rotary electric machine includes a motor housing, and the motor housing has a recessed portion in an upper portion, the inverter device includes an inverter housing having a lid shape, an electric component is disposed toward the rotary electric machine on an inner surface of the inverter housing, and the inverter housing is fixed to the motor housing such that an accommodation chamber in which the electric component is accommodated is formed by the inverter housing and the recessed portion, in the accommodation chamber, the electric component includes a first electric component and a second electric component having a temperature higher than that of the first electric component, and the first electric component and the second electric component are disposed apart from each other in an axial direction of the rotary electric machine, and a shielding wall is formed in the recessed portion of the motor housing to separate a space in the accommodation chamber into a region in which the first electric component is disposed and a region in which the second electric component is disposed.

2. The drive device according to claim 1, wherein the motor housing includes a cylindrical inner housing into which a stator of the rotary electric machine is fitted, a cooling water flow path is formed between the inner housing and the motor housing, and a seal member is provided at a joint portion where the inner housing and the motor housing are in contact with each other, and the shielding wall is erected on an outer peripheral portion of the joint portion of the motor housing.

3. The drive device according to claim 1, wherein the first electric component is a capacitor module constituting the inverter device, and a rib protruding toward the capacitor module is formed in the recessed portion at a position facing to the capacitor module.

4. The drive device according to claim 1, wherein the second electric component is a three-phase bus bar configured to exchange electric power between the rotary electric machine and the inverter device, and the three-phase bus bar extends outward in the axial direction farther than the shielding wall in the rotary electric machine.

5. The drive device according to claim 1, wherein the motor housing includes a cooling water inlet from which cooling water flows in, and a cooling water flow path through which cooling water flowing in from the cooling water inlet circulates around an outer periphery of the rotary electric machine, and a communication port that allows the cooling water inlet to communicate with the cooling water flow path is provided at a position close to the shielding wall.

* * * * *